(12) United States Patent
Dahlhaus-Preussler (10) Patent No.: US 8,646,782 B2
(45) Date of Patent: Feb. 11, 2014

(54) SEALING ARRANGEMENT AND RADIAL SHAFT SEAL MADE THEREFROM

(75) Inventor: Ulrich Dahlhaus-Preussler, Edingen-Neckarhausen (DE)

(73) Assignee: Carl Freudenberg KG, Weinheim (DE)

( * ) Notice: Subject to any disclaimer, the term of this patent is extended or adjusted under 35 U.S.C. 154(b) by 146 days.

(21) Appl. No.: 12/918,382

(22) PCT Filed: Feb. 20, 2008

(86) PCT No.: PCT/EP2008/001317
§ 371 (c)(1),
(2), (4) Date: Aug. 19, 2010

(87) PCT Pub. No.: WO2009/103314
PCT Pub. Date: Aug. 27, 2009

(65) Prior Publication Data
US 2011/0018209 A1    Jan. 27, 2011

(51) Int. Cl.
*F16J 15/32* (2006.01)
(52) U.S. Cl.
USPC ............................. 277/559; 277/560; 277/568
(58) Field of Classification Search
USPC .................................. 277/559, 560, 562, 568
See application file for complete search history.

(56) References Cited

U.S. PATENT DOCUMENTS

| 3,504,919 A | 4/1970 | Halliday et al. |
| 4,550,920 A | 11/1985 | Matsushima |
| 5,511,886 A * | 4/1996 | Sink ............................... 384/486 |
| 5,645,283 A | 7/1997 | Drucktenhengst et al. |
| 5,649,709 A | 7/1997 | Munekata et al. |

(Continued)

FOREIGN PATENT DOCUMENTS

| DE | 41 23 392 | 1/1993 |
| DE | 195 18 577 | 11/1996 |

(Continued)

OTHER PUBLICATIONS

International Search Report, issued Nov. 27, 2008, for PCT International Application No. PCT/EP2008/001317.

*Primary Examiner* — Gilbert Lee
(74) *Attorney, Agent, or Firm* — Pearl Cohen Zedek Latzer Baratz LLP (57) ABSTRACT

A sealing arrangement, comprising a shaft (1) to be sealed, which is enclosed by a radial shaft seal (2), wherein the radial shaft seal (2) comprises two sealing lips (7, 8) for mutually sealing two spaces (5, 6) to be sealed and filled with a medium (3, 4) to be sealed, said sealing lips being disposed axially adjacent to each other at a distance from each other and delimiting a lubricant reservoir (18) with the shaft (1) to be sealed, wherein the first sealing lip (7) is axially curved in the direction of the first space (5) to be sealed in order to seal the first medium (3) to be sealed, and wherein the second sealing lip (8) is axially curved in the direction of the second space (6) to be sealed in order to seal the second medium (4) to be sealed, wherein both sealing lips (7, 8) each have at least one sealing rib (9, 10), which are delimited by mutually intersecting conical surfaces (11, 12; 13, 14), wherein on both sealing ribs (9, 10) the first conical surface (11, 13) facing the first space (5) to be sealed together with the surface (15) of the shaft (1) to be sealed encloses an angle (16, 17) that is larger than the second conical surface (12, 14) facing the second space (6) to be sealed.

13 Claims, 5 Drawing Sheets

(56) References Cited

U.S. PATENT DOCUMENTS

| | | | |
|---|---|---|---|
| 5,649,710 A * | 7/1997 | Kanda | 277/371 |
| 6,726,211 B1 * | 4/2004 | Kuroki et al. | 277/353 |
| 7,784,796 B2 * | 8/2010 | Beatty | 277/560 |
| 7,837,017 B2 * | 11/2010 | Imoto et al. | 188/322.17 |
| 2006/0186603 A1 | 8/2006 | Berdichevsky | |
| 2008/0284110 A1 * | 11/2008 | Dahlheimer | 277/551 |

FOREIGN PATENT DOCUMENTS

| | | |
|---|---|---|
| EP | 0 551 563 | 7/1993 |
| EP | 0 744 567 | 11/1996 |
| GB | 2 138 081 | 10/1984 |

* cited by examiner

SEALING ARRANGEMENT AND RADIAL SHAFT SEAL MADE THEREFROM

CROSS-REFERENCE TO RELATED APPLICATIONS

This application is a National Phase Application of PCT International Application No. PCT/EP2008/001317, International Filing Date Feb. 20, 2008, which is hereby incorporated by reference in its entirety.

FIELD OF THE INVENTION

The invention relates to a sealing arrangement and to a radial shaft seal ring used therein.

BACKGROUND OF THE INVENTION

Such a sealing arrangement and such a radial shaft seal ring are disclosed in European patent application EP 0 744 567 A1. The first sealing lip is configured as a dust lip and it has concentrically encircling sealing ribs, whereby the sealing ribs are perforated at circumferential places that are offset with respect to each other in the circumferential direction. Such a configuration vents the space between the two sealing lips. The space between the two sealing lips is configured as a lubricant reservoir and is filled with a lubricant in order to achieve improved emergency running properties. The sealing ribs of the sealing lips are configured in such a way that, in each case, a conveying effect is generated in the direction of each of the adjacent spaces that are to be sealed. For this purpose, the intersecting conical surfaces of the appertaining sealing ribs are configured to be essentially minor-image to an imaginary radial plane that runs through the lubricant reservoir.

SUMMARY OF THE INVENTION

The invention is based on the objective of refining a sealing arrangement and a radial shaft seal ring used therein, so as to achieve a longer service life as a result of the permanently reduced friction in the area of the sealing lips.

This objective is achieved according to the invention by a sealing arrangement having the features of claim 1 and by a radial shaft seal ring having the features of claim 13. The subordinate claims refer to advantageous embodiments.

In order to achieve the objective, a sealing arrangement is put forward comprising a shaft that is to be sealed and that is surrounded by a radial shaft seal ring, whereby, for purposes of reciprocally sealing two spaces that are to be sealed and that are each filled with the medium that is to be sealed off, the radial shaft seal ring comprises two sealing lips that are arranged axially adjacent to and at a distance from each other, and that, together with the shaft that is to be sealed, delimit a lubricant reservoir, whereby the first sealing lip is curved axially in the direction of the first space that is to be sealed, for purposes of sealing off the first medium that is to be sealed off, and whereby the second sealing lip is curved axially in the direction of the second space that is to be sealed, for purposes of sealing off the second medium that is to be sealed off, whereby both sealing lips each have at least one sealing rib, each sealing rib being delimited by conical surfaces that intersect each other, whereby, in both sealing ribs, together with the surface of the shaft that is to be sealed, the first conical surface facing the first space that is to be sealed encloses a larger angle than the second conical surface facing the second space that is to be sealed.

The radial shaft seal ring exhibits outstanding performance characteristics over the course of a long service life, thanks to the lubricant reservoir and to the special configuration of the sealing ribs with their conical surfaces, namely, due to the fact that, in both sealing ribs, together with the surface of the shaft that is to be sealed, the first conical surfaces of the sealing ribs enclose a larger angle than the second conical surfaces, and the two sealing ribs are arranged in the same direction in such a way that they have the same conveying direction, namely, axially towards the first space that is to be sealed. All of the sealing ribs are well lubricated by the lubricant contained in the lubricant reservoir, which is preferably in the form of barrier grease. The resultant permanently low level of friction translates into lubrication for the entire service life and into continuously low temperatures in the area of the sealing ribs, into a low level of wear and tear, and thus all in all, into a long service life. The sealing arrangement according to the invention and the radial shaft seal ring according to the invention display good emergency running properties.

The use of an above-mentioned sealing arrangement and/or of an above-mentioned radial shaft seal ring is especially advantageous if the first medium that is to be sealed off has a lower viscosity than the second medium that is to be sealed off; this is the case, for example, in a washing machine or in a dishwasher, when the first medium is a washing solution and the second medium is a bearing grease. The conveying direction is then towards the washing solution.

Particularly high requirements are made of sealing arrangements and radial shaft seal rings in washing machines or dishwashers.

If a barrier grease having good barrier properties is used in the lubricant reservoir in order to reliably separate the two media that are to be sealed off from each other, this is normally associated with a high level of wear and tear of the sealing ribs since, for functional reasons, the barrier grease that is employed only has a low oil-separation rate. Moreover, such types of barrier grease often migrate into dead spaces of the lubricant reservoir, in other words, away from the sealing ribs.

If, in contrast, grease having a good oil-separation rate is used inside the lubricant reservoir, then the sealing ribs are sufficiently lubricated for a short period of time. However, it is a drawback here that these types of grease generally exhibit poor barrier behavior and are quickly washed out by the washing solution, as a result of which they can no longer adequately lubricate the sealing ribs.

These contradictory goals are solved by the sealing arrangement according to the invention with the seal ring according to the invention.

The barrier grease employed can readily have a good oil-separation rate in order to adequately lubricate the sealing ribs of the sealing lip, without being washed out.

The barrier grease is prevented from being washed out in that preferably not only the first sealing lip has at least two first sealing ribs arranged in a functional series connection but also in that the second sealing lip preferably has two, more preferably three, second sealing ribs arranged in a functional series connection. By means of such a configuration, smaller lubricant pockets—which are located between the individual sealing ribs—are arranged between the two sealing lips in a functional parallel connection with respect to the lubricant reservoir. The lubricant pockets are delimited by the axially adjacent sealing ribs of the individual sealing lips.

Even if the first medium that is to be sealed off washes some of the barrier grease with the good oil-separation rate out of the lubricant reservoir during the proper use of the sealing arrangement or of the radial shaft seal ring, nevertheless a sufficient amount of barrier grease will remain, at least in the lubricant pockets of the individual sealing lips, especially of the second sealing lip, in order to ensure adequate lubrication during operation.

In contrast to prior-art radial shaft seal rings known from the state of the art, the sealing ribs of the second sealing lip are not configured so as to primarily prevent the second medium from escaping out of the second space that is to be sealed and penetrating into the lubricant reservoir. Together with the surface of the shaft that is to be sealed, the first conical surfaces of the second sealing ribs of the second sealing lip facing the first space that is to be sealed enclose a larger angle than the second conical surfaces facing the second space that is to be sealed. This prevents barrier grease from being conveyed under the second sealing lip and into the second space that is to be sealed, in the case of a washing machine or a dishwasher, into the space containing the bearing grease.

A force can be exerted onto the second sealing lip by an annular coil spring. If the shaft that is to be sealed does not rotate relative to the second sealing lip, in other words, if the second sealing lip seals statically, then the annular coil spring in this operating state causes the second sealing lip to exert a radial sealing pressure onto the surface of the shaft that is to be sealed, providing a good sealing result; this prevents leaks in both axial directions.

The radial shaft seal ring can have an L-shaped support element with one radial leg onto which the two sealing lips are secured and with one axial leg. Such a construction can be manufactured simply and inexpensively, and can be used in many application cases.

The axial leg can be radially surrounded on the outside by a sealing bead that can be statically loaded. During its proper use, the radial shaft seal ring is pressed, for example, into a bore in the housing that is traversed by the shaft that is to be sealed. The sealing bead statically seals the bore in the housing.

The two sealing lips and the sealing bead can be made of a matching sealing material. From the standpoint of its production, such a seal ring can be manufactured easily and inexpensively.

Diverging from this, the possibility also exists that each of the sealing lips and the sealing bead are made of a sealing material whose performance characteristics are adapted to the application case in question.

The first sealing ribs of the first sealing lip and/or the second sealing ribs of the second sealing lip can each have a constantly changing contact force onto the surface that is to be sealed.

This can be done in that the individual sealing ribs of the sealing lips have a constantly changing diameter.

The first as well as the second sealing lips can each have adjacent sealing ribs whose diameter increases axially in the direction of the second space.

According to another embodiment, the sealing ribs of the second sealing lip facing the lubricant reservoir can have a larger diameter than the sealing ribs arranged in the direction of the second space.

Owing to the different diameters of the sealing ribs, at first only/mainly one sealing rib, namely, the one with the smallest diameter, comes into contact with the surface that is to be sealed; friction is kept to a minimum as a result of this and also because of the lubrication with barrier grease from the lubricant reservoir and from the lubricant pockets. If the sealing rib wears out over the course of its use, the axially adjacent sealing rib that has a slightly larger diameter than the sealing rib that had previously been in contact with the surface of the shaft that is to be sealed then comes to lie on the surface, seals it and is likewise once again lubricated by new, unused barrier grease. This not only ensures a continuous low level of friction and a good seal, but also substantially increases the service life of the sealing arrangement or of the seal ring.

A third sealing lip can be installed upstream from the second sealing lip in the direction of the second space that is to be sealed. The third sealing lip provides additional protection against the penetration of bearing grease into the sealing area of the second sealing lip and into the lubricant reservoir.

Together with the surface of the shaft that is to be sealed, the second sealing lip and the third sealing lip arranged axially adjacent to and at a distance thereto can delimit a second lubricant reservoir that, analogously to the first lubricant reservoir, is likewise filled with barrier grease. This brings about a particularly effective separation of the two media/spaces that are to be sealed off with respect to each other.

The second sealing ribs can be configured to be particularly small as micro-ribs, thus forming micro-lubricant pockets.

Moreover, a radial shaft seal ring is being claimed here which, as described above, comprises two sealing lips that are curved in the opposite axial direction—the first sealing lip towards a first side and the second sealing lip towards a second side—whereby the two sealing lips each have at least one sealing rib, each sealing rib being delimited by intersecting conical surfaces, whereby, in both sealing ribs, together with an imaginary center line of the radial shaft seal ring, each of the first conical surfaces arranged axially on the same first side encloses a larger angle than the second conical surfaces that are each likewise arranged axially on the same second side.

It is especially advantageous to use the above-mentioned sealing arrangement and the above-mentioned radial shaft seal ring in washing machines or dishwashers since here, media having very different viscosities have to be sealed off, whereby one of the media, namely, the washing solution, has grease-dissolving properties. In conventional radial shaft seal rings, such a use accounts for a very limited service life since the sealing ribs on the surface that is to be sealed are no longer adequately lubricated already after a short period of use.

BRIEF DESCRIPTION OF THE DRAWINGS

FIGS. 1 to 5 show three embodiments of the seal arrangement according to the invention or of the radial shaft seal ring according to the invention, which will be described in greater detail below. The figures show schematic depictions of the following:

DETAILED DESCRIPTION OF THE INVENTION

FIGS. 1 to 4 show three embodiments of a radial shaft seal ring 2 that are each part of a sealing arrangement.

The sealing arrangement comprises a shaft that is to be sealed and that is surrounded by the radial shaft seal ring, whereby, for purposes of reciprocally sealing two spaces that are to be sealed, the radial shaft seal ring comprises two sealing lips that are arranged axially adjacent to and at a distance from each other. The first sealing lip is curved axially in the direction of the first space that is to be sealed, while the second sealing lip is curved axially in the direction of the second space that is to be sealed, whereby both sealing lips each have at least one sealing rib, each sealing rib being delimited by conical surfaces that intersect each other.

Figure 1:
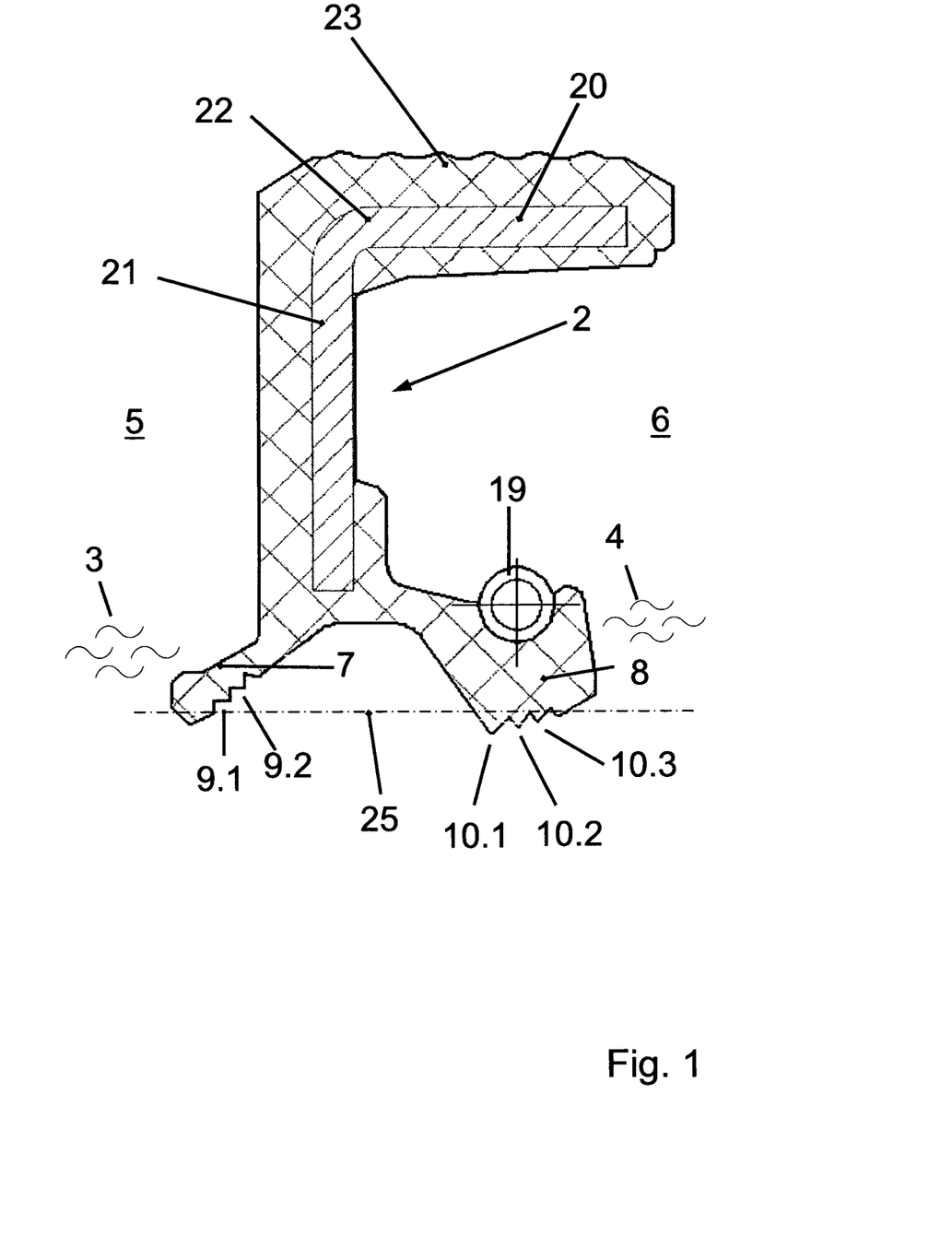
FIG. 1 a first embodiment of the radial shaft seal ring according to the invention in its newly manufactured, non-installed state.

FIG. 1 shows a first embodiment of a radial shaft seal ring 2, whereby this radial shaft seal ring 2 is depicted in its newly manufactured, that is to say, non-installed state. In its installed state, when the radial shaft seal ring 2 is part of a sealing arrangement, the radial shaft seal ring 2 from FIG. 1 is shown in FIG. 2.

Figure 2:
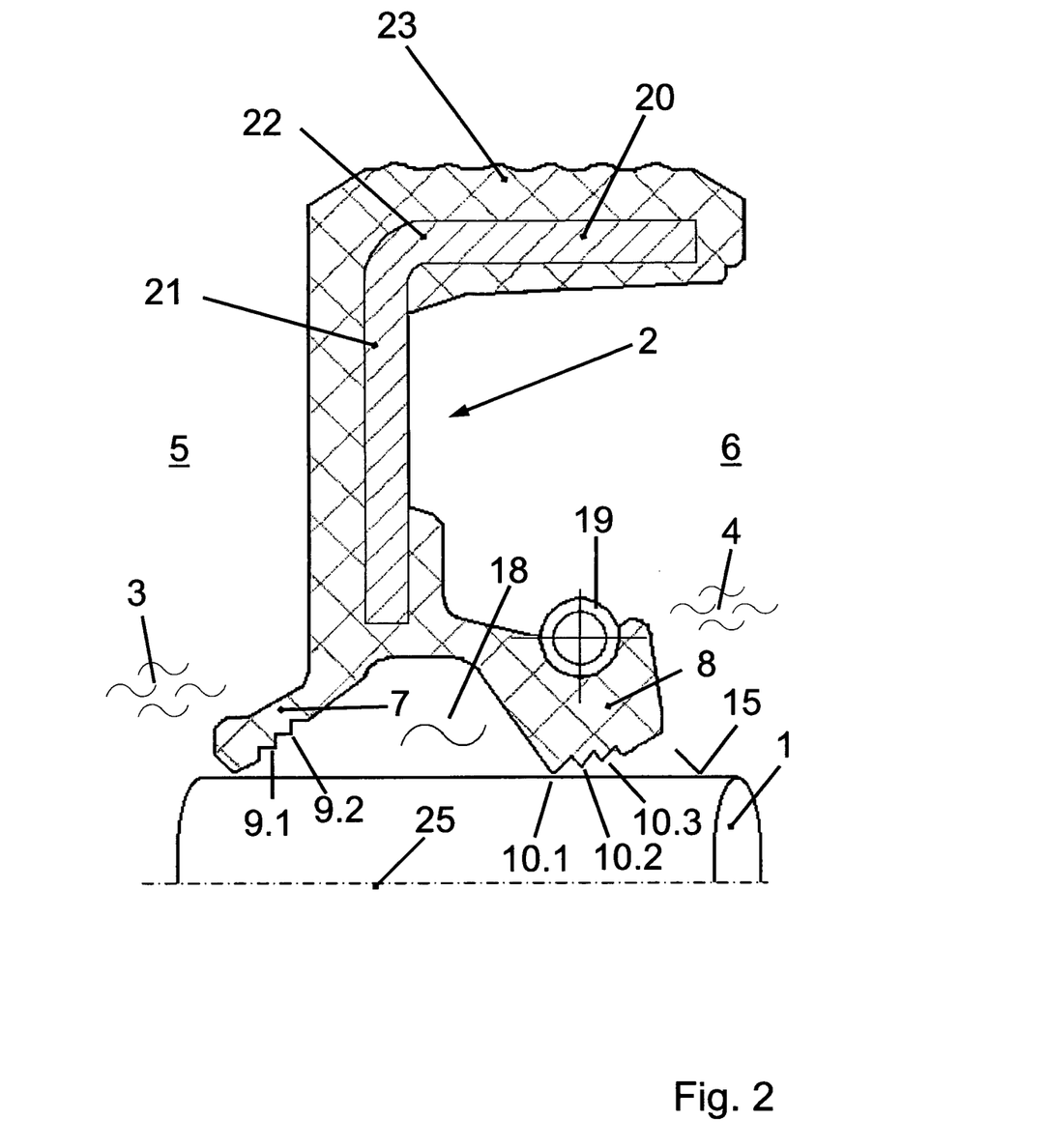
FIG. 2 the radial shaft seal ring from FIG. 1 as part of a sealing arrangement in its installed state.
Figure 3:
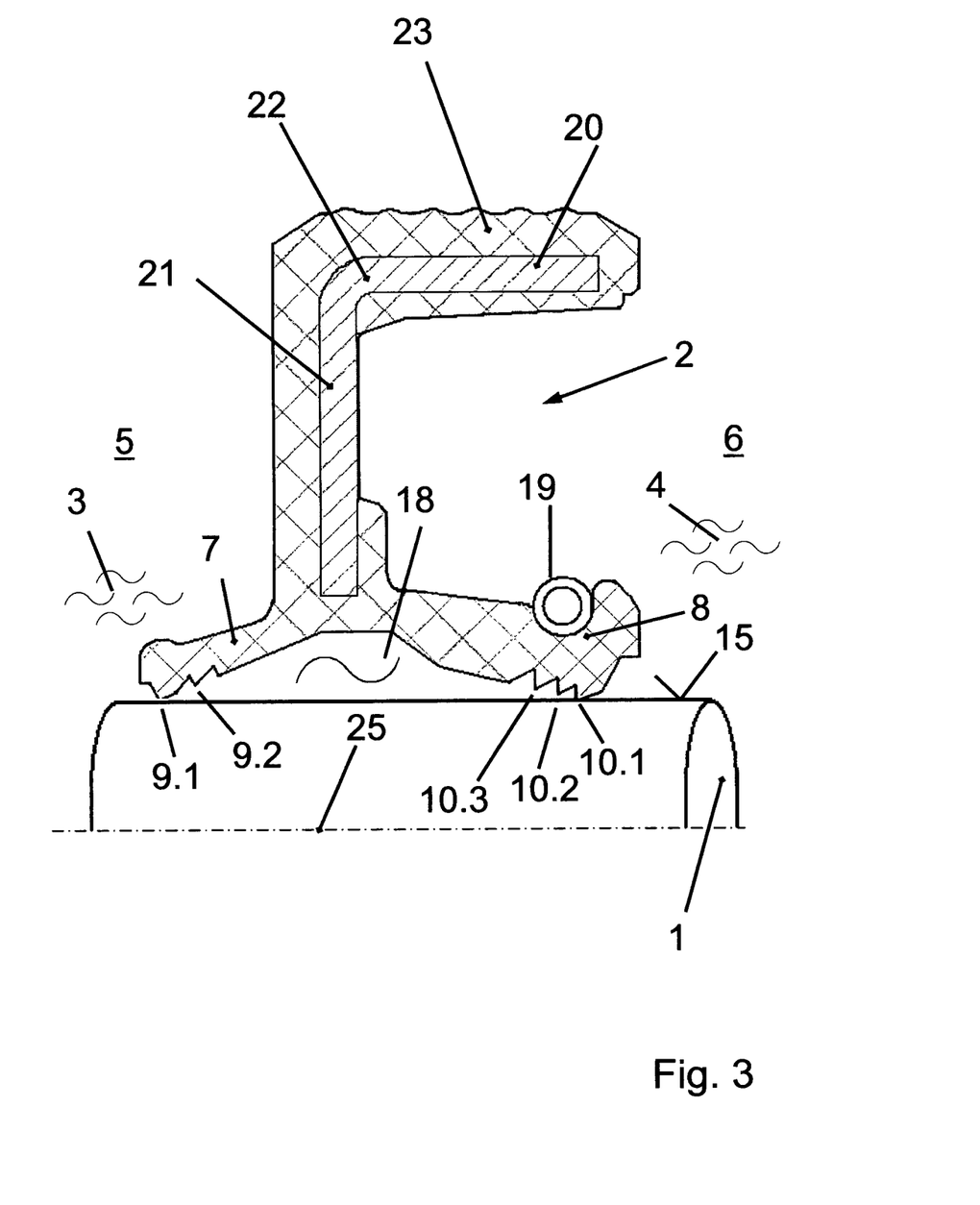
FIG. 3 a second embodiment in which the second sealing lip is configured in a manner that differs from the second sealing lip of the first embodiment according to FIGS. 1 and 2.
Figure 4:
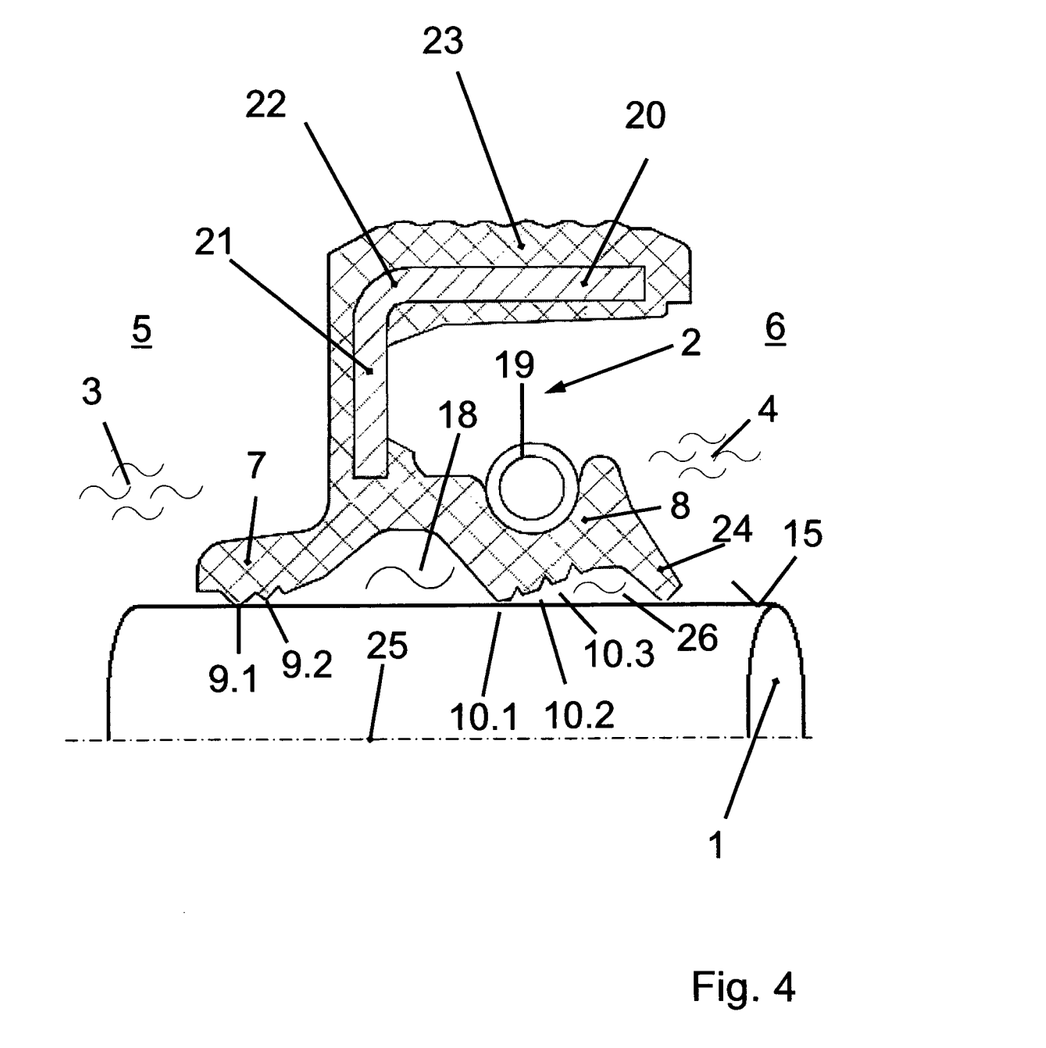
FIG. 4 a third embodiment in which a third sealing lip is arranged axially on the second sealing lip in the direction of the second space.

FIGS. 2 to 4 show three different embodiments of a radial shaft seal ring 2 in a sealing arrangement. The two sealing lips 7, 8 of the radial shaft seal ring 2 surround the surface 15 of the shaft 1 that is to be sealed so as to seal it under elastic pre-stress.

All of the sealing arrangements shown here are employed in washing machines or dishwashers, whereby media 3, 4 that are to be sealed off are enclosed in the two spaces 5, 6 that are to be sealed. The first medium 3 that is to be sealed off consists of the washing solution while the second medium 4 that is to be sealed off consists of the bearing grease of a roller bearing of the washing machine or dishwasher.

The two sealing lips 7, 8 are arranged adjacent to and at an axial distance from each other, whereby the two sealing lips 7, 8 and the surface 15 of the shaft 11 that is to be sealed delimit the lubricant reservoir 18 that is filled with barrier grease. On the one hand, the barrier grease brings about the lubrication of the two sealing lips 7, 8 over the entire service life as well as the resultant low level of friction and low wear and tear in the area of the two sealing lips 7, 8, and, on the other hand, the barrier grease forms a barrier for the first medium 3 that is to be sealed off, so that the latter can be kept away from the second sealing lip 8 as reliably as possible. The two sealing lips 7, 8 are curved in opposite directions with respect to each other in the axial direction and, in the embodiment shown here, they have two first sealing ribs 9.1. 9.2 and three second sealing ribs 10.1, 10.2, 10.3.

In order to achieve good performance characteristics over the course of a long service life, it is advantageous if at least the interstices between the first and/or second sealing ribs 9.1, 9.2, 10.1, 10.2, 10.3 are each filled with the barrier grease. This reduces the risk of greater friction and thus of greater wear and tear in the area of the second sealing lip 8.

Owing to its specially configured second sealing ribs 10.1, 10.2, 10.3 and to the resulting axial conveying effect in the direction of the first space 5 that is to be sealed, the second sealing lip 8 is particularly well-suited to hold the barrier grease over the course of a long service life Like the first sealing ribs 9.1, 9.2 of the first sealing lip 7, the conical surfaces 13 facing the first space 5 that is to be sealed are configured in such a way that, together with the surface 15 of the shaft 1 that is to be sealed, they enclose a larger angle 17 than the second conical surfaces 14 facing the second space 6 that is to be sealed.

In the embodiment shown here, the second sealing lip 8 is under the force exerted by a ring coil spring 19, so that even if the shaft 1 is relatively stationary, a good sealing result is achieved in the area of the second sealing lip 8.

In the embodiments shown here, the radial shaft seal rings 2 are pressed into the bore in a housing not shown here. The L-shaped support element 20 has one radial leg 21 onto which the two sealing lips 7, 8 are secured and one axial leg 22 that is radially surrounded on the outside by a sealing bead 23 that is statically loaded.

The first sealing ribs 9.1, 9.2 as well as the second sealing ribs 10.1, 10.2, 10.3 each have diameters that differ from each other.

In the embodiments shown here, each time only one of the sealing ribs 9, 10 from the group of the sealing ribs 9, 10 makes contact with the surface 15 of the shaft 1 that is to be sealed so as to seal it. In contrast, each of the sealing ribs that are arranged axially adjacent for this purpose surround the surface 15 at a radial distance or with a considerably diminished radial contact pressure. This ensures low-friction operation of the radial shaft seal ring as well as low heat generation in the area of the individual sealing lips.

If, during proper use of the radial shaft seal ring, the sealing rib 9.1, 10.1 that is at first in contact with the surface 15 becomes worn out due to friction, the axially adjacent sealing rib 9.2, 10.2 automatically comes into contact with the surface 15 that is to be sealed. As a result, the good performance characteristics remain unchanged over the course of a long service life.

In FIGS. 1, 2 and 4, the appertaining diameters of the axially adjacent second sealing ribs 10.1, 10.2, 10.3 of the second sealing lip 8 are axially enlarged in the direction of the second space 6.

The sealing ribs 10.1, 10.2, 10.3 come into use one after the other and are then each lubricated by barrier grease from the lubricant reservoir 18 and/or from the second lubricant reservoir 26.

In FIG. 3, in contrast, the second sealing ribs 10.1, 10.2, 10.3 are located inside the lubricant reservoir 18, whereby the axially adjacent second sealing ribs 10.1, 10.2, 10.3 have a diameter that increases axially in the direction of the first space 5. This makes the lubrication of the second sealing lip 8 particularly efficient.

In FIG. 4, a third sealing lip 24 is installed upstream from the second sealing lip 8 in the direction of the second space 6 that is to be sealed, thus creating a second lubricant reservoir 26 that is associated with the lubricant reservoir 18 adjacent to it and at an axial distance. Thanks to the functional series connection of the two lubricant reservoirs 18, 26, the two spaces 5, 6 that are to be sealed are especially reliably sealed with respect to each other.

Figure 5:
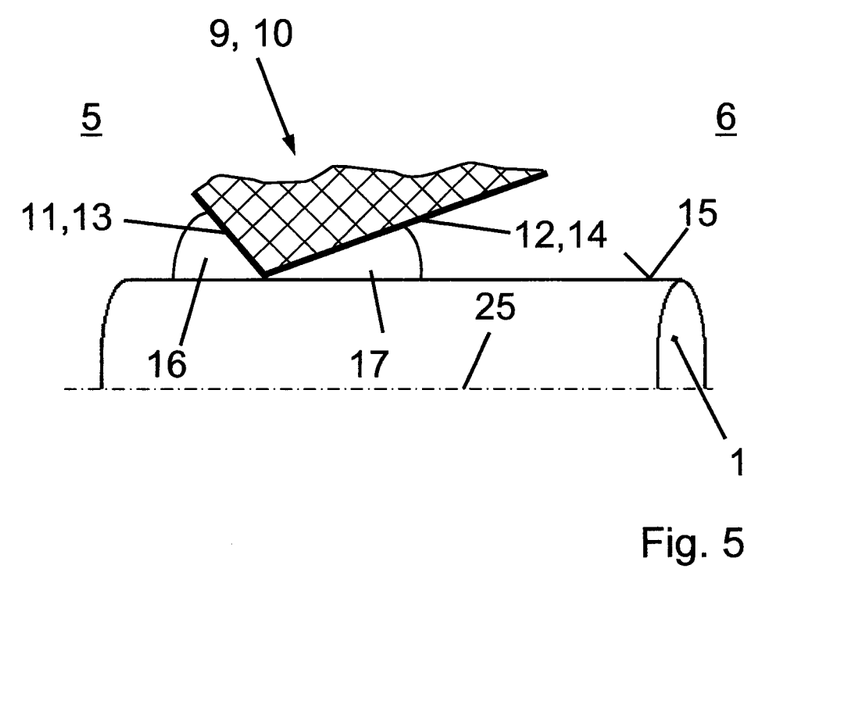
FIG. 5 a sectional view of a first or second sealing rib, in an enlarged view.

By way of an example, FIG. 5 shows a sealing rib 9 or 10 that can be part of the first or second sealing lip 7, 8. It can be seen that the sealing rib 9, 10 is delimited by intersecting conical surfaces 11, 12; 13, 14, whereby, together with the surface 15 of the shaft 1 that is to be sealed, the first conical surface 11, 13 facing the first space 5 that is to be sealed encloses an angle 16, 17 that is larger than the second conical surface 12, 14 facing the second space 6 that is to be sealed. For this reason, the conveying direction is the same.

The invention claimed is:
1. A sealing arrangement, comprising:
a shaft that is to be sealed and that is surrounded by a radial shaft seal ring,
wherein the radial shaft seal ring comprises a first sealing lip and a second sealing lip, each of said first and second sealing lips being arranged axially adjacent to and at a distance from each other and together with a surface of the shaft to be sealed, configured to delimit a lubricant reservoir there-between, whereby the first sealing lip is curved axially in the direction of a first space to be sealed, for purposes of sealing off a first medium filled therein, and whereby the second sealing lip is curved axially in the direction of a second space to be sealed, for purposes of sealing off a second medium filled therein, whereby each first and second sealing lips have at least one sealing rib, each sealing rib being delimited by intersecting first and second conical surfaces, said first conical surface facing the first space to be sealed enclosing a larger angle relative to the surface of the shaft than the second conical surface facing the second space to be sealed, and wherein each sealing rib is configured to face in the same direction thereby producing a conveying direction axially towards the first space to be sealed, wherein a diameter of each of the at least one sealing rib is larger for each sealing rib towards the second space to be sealed, and wherein, on each sealing lip, only the sealing rib having the smallest diameter contacts the surface of the shaft to be sealed when said sealing arrangement is in an initially installed state, and wherein, on each sealing lip, each of said at least one sealing ribs comes into contact with the surface of the shaft to be sealed one after the other over a period of time in order of increasing diameter.

2. The sealing arrangement according to claim 1, wherein the lubricant reservoir is filled with barrier grease.

3. The sealing arrangement according to claim 1, wherein the first medium that is to be sealed off has a lower viscosity than the second medium that is to be sealed off.

4. The sealing arrangement according to claim 1, wherein the first medium is a washing solution and in that the second medium is a bearing grease.

5. The sealing arrangement according to claim 1, wherein the first sealing lip has at least two first sealing ribs arranged in a functional series connection.

6. The sealing arrangement according to claim 1, wherein the second sealing lip preferably has at least two second sealing ribs arranged in a functional series connection.

7. The sealing arrangement according to claim 1, wherein the second sealing lip is under the force exerted by a ring coil spring in the radial direction.

8. The sealing arrangement according to claim 1, wherein the radial shaft seal ring has an L-shaped support element with one radial leg onto which the two sealing lips are secured and with one axial leg.

9. The sealing arrangement according to claim 8, wherein the axial leg is radially surrounded on the outside by a sealing bead that can be statically loaded.

10. The sealing arrangement according to claim 1, wherein the first sealing ribs of the first sealing lip and/or the second sealing ribs of the second sealing lip each exerts a constantly changing contact force onto the surface that is to be sealed.

11. The sealing arrangement according to claim 1, wherein the individual sealing ribs of the sealing lips have a constantly changing diameter.

12. The sealing arrangement according to claim 1, wherein a third sealing lip is installed upstream from the second sealing lip in the direction of the second space that is to be sealed.

13. A radial shaft seal ring of a sealing arrangement comprising:

two sealing lips curved in opposing axial directions, wherein a first sealing lip of the two sealing lips is curved towards a first side and a second sealing lip of the two sealing lips is curved towards a second side, wherein each of the two sealing lips has at least one sealing rib, each sealing rib being delimited by intersecting first and second conical surfaces, whereby, in both sealing ribs, together with an imaginary center line of the radial shaft seal ring, the first conical surface of each sealing rib arranged axially facing the first side encloses a larger angle than the second conical surface of each sealing rib that is likewise arranged axially facing the second side, wherein each sealing rib is arranged in the same direction and has a conveying direction axially towards the first side, and wherein a diameter of each of the at least one sealing rib is larger for each sealing rib towards the second space to be sealed, and wherein, on each sealing lip, only the sealing rib having the smallest diameter contacts the surface of the shaft to be sealed when said sealing arrangement is in an initially installed state, and wherein, on each sealing lip, each of said at least one sealing ribs comes into contact with the surface of the shaft to be sealed one after the other over a period of time in order of increasing diameter.

* * * * *